United States Patent Office 3,453,031
Patented July 1, 1969

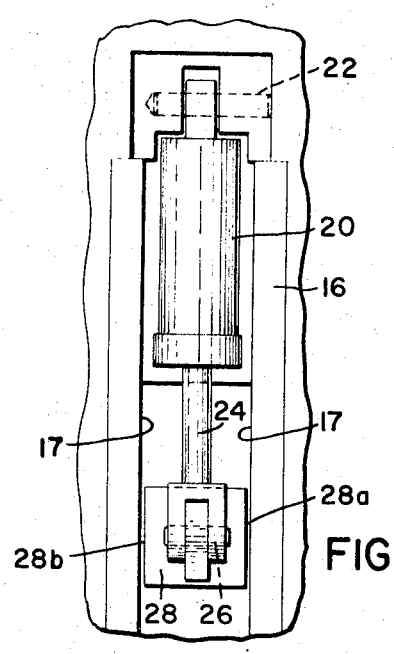
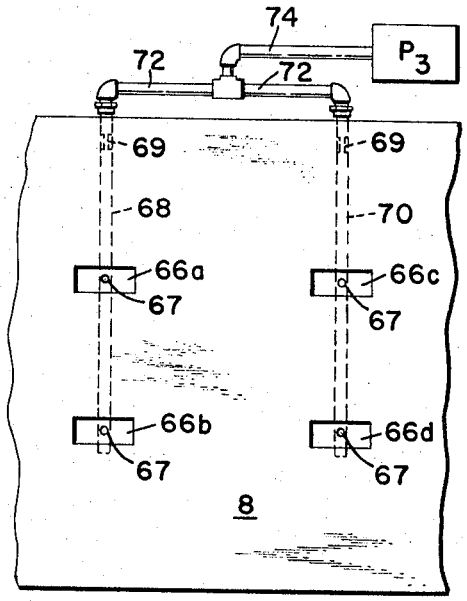
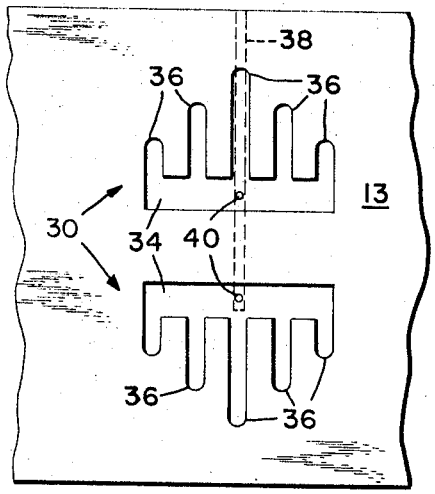
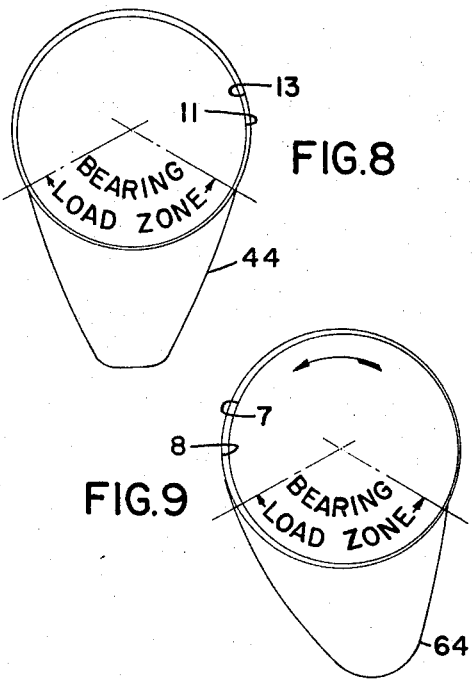

3,453,031
BEARING ASSEMBLY
Samuel S. Rickley, West Boylston, and John A. Bjork, Worcester, Mass., assignors to Morgan Construction Company, Worcester, Mass., a corporation of Massachusetts
Filed Apr. 6, 1967, Ser. No. 628,945
Int. Cl. F16c 7/04, 35/00, 23/10
U.S. Cl. 308—9       6 Claims

ABSTRACT OF THE DISCLOSURE

A bearing assembly for a rotatable shaft including an eccentric control sleeve rotatably supported by a stationary housing assembly. The shaft is journalled for rotation within the control sleeve, with a combination of hydrostatic and hydrodynamic lubricating means being employed to maintain lubricant films at the bearing load zone between the control sleeve, the shaft and the housing assembly.

---

This invention relates generally to industrial rolling installations such as rolling mills in the steel industry, where rolls are journalled between bearings carried in stationary frames, and more particularly to an improved means for adjusting the space between rolls during the rolling operation.

The prior art devices of this type can generally be separated into one of three broad categories. First, there are the conventional "screw-down" devices which laterally adjust the bearings relative to the roll axes by means of large power driven screws threaded through the roll frames. Experience has indicated that the minimum obtainable coefficient of friction between the screw threads and the roll frame is usually about .12. This, when combined with the high compressive forces usually exerted on the stock being rolled, creates an excessively high resistance to rotation of the screws. Consequently, this type of roll adjusting mechanism has been found to be relatively sluggish and thus not suited for automatic control of modern high speed rolling operations where quick response is an absolute necessity.

Another type of prior art roll adjusting device relies on the principle of a sliding wedge positioned between each roll bearing and the stationary frame. Here again, frictional resistance to wedge adjustment is a serious problem. One such device, issustrated in U.S. Patent No. 3,197,986 (Freedman et al.) employs a Teflon coating on the adjusting wedge to reduce the coefficient of friction between sliding surfaces to about .030. Although this development represents an improvement over the more conventional screw-down devices, the power needed to adjust each wedge is still considered to be a serious limiting factor on the speed with which the system is capable of responding to corrective signals during the rolling operation.

A third type of prior art device employs rotatable eccentric sleeves in the bearing assembly. The axis of the roller or shaft is adjusted laterally by rotating the eccentric sleeve relative to the surrounding stationary bearing housing. Devices of this type have been employed with some measure of success where bearing loads are relatively low and where reaction speed is not critical. However, because of the fact that conventional eccentric sleeve arrangements involve metal-to-metal contact between the sleeve, the shaft journalled therein and the surrounding bearing housing, high frictional resistance has again been a limiting factor preventing use of such devices in heavy industrial applications.

The present invention is of the latter type wherein an eccentric control sleeve is employed to laterally adjust the rotational axis of a shaft journalled therein, and has as one of its primary objectives a substantial reduction in frictional resistance to eccentric sleeve rotation. This is accomplished by maintaining a film of lubricant at the bearing load zone between the rotating shaft, the eccentric control sleeve and the surrounding stationary bearing housing. In the preferred embodiment of the invention to be hereinafter described in greater detail, the lubricant film between the inside surface of the eccentric control sleeve and the rotating shaft is hydrodynamically maintained with a resulting coefficient of friction between these two components ranging as low as 0.0015 to 0.002. The lubricant film between the outer surface of the control sleeve and the surrounding bearing housing assembly is hydrostatically maintained with virtually no resulting frictional resistance to sleeve rotation between these two surfaces. Thus it can be seen that with this arrangement, frictional resistance to rotative adjustment of the eccentric control sleeve is reduced to an absolute minimum with a corresponding significant increase in the speed with which the apparatus is capable of responding to corrective signals during a rolling operation.

Other objects and advantages of the present invention will become more apparent as the description proceeds with the aid of the accompanying drawings in which:

FIGS. 3–6 are sectional views taken along lines 3—3 4—4, 5—5, and 6—6 of FIG. 2;

FIG. 7 is a partial side view of the bearing assembly looking towards the left as viewed in FIG. 2 with parts removed in order to show the means employed for rotating the eccentric control sleeve;

FIG. 8 is a diagrammatic illustration of the hydrostatic pressure profile developed between the eccentric control sleeve and the surrounding bearing housing;

FIG. 9 is another diagrammatic illustration of the hydrodynamic pressure profile developed between the rotating shaft and the eccentric control sleeve;

Figure 1:
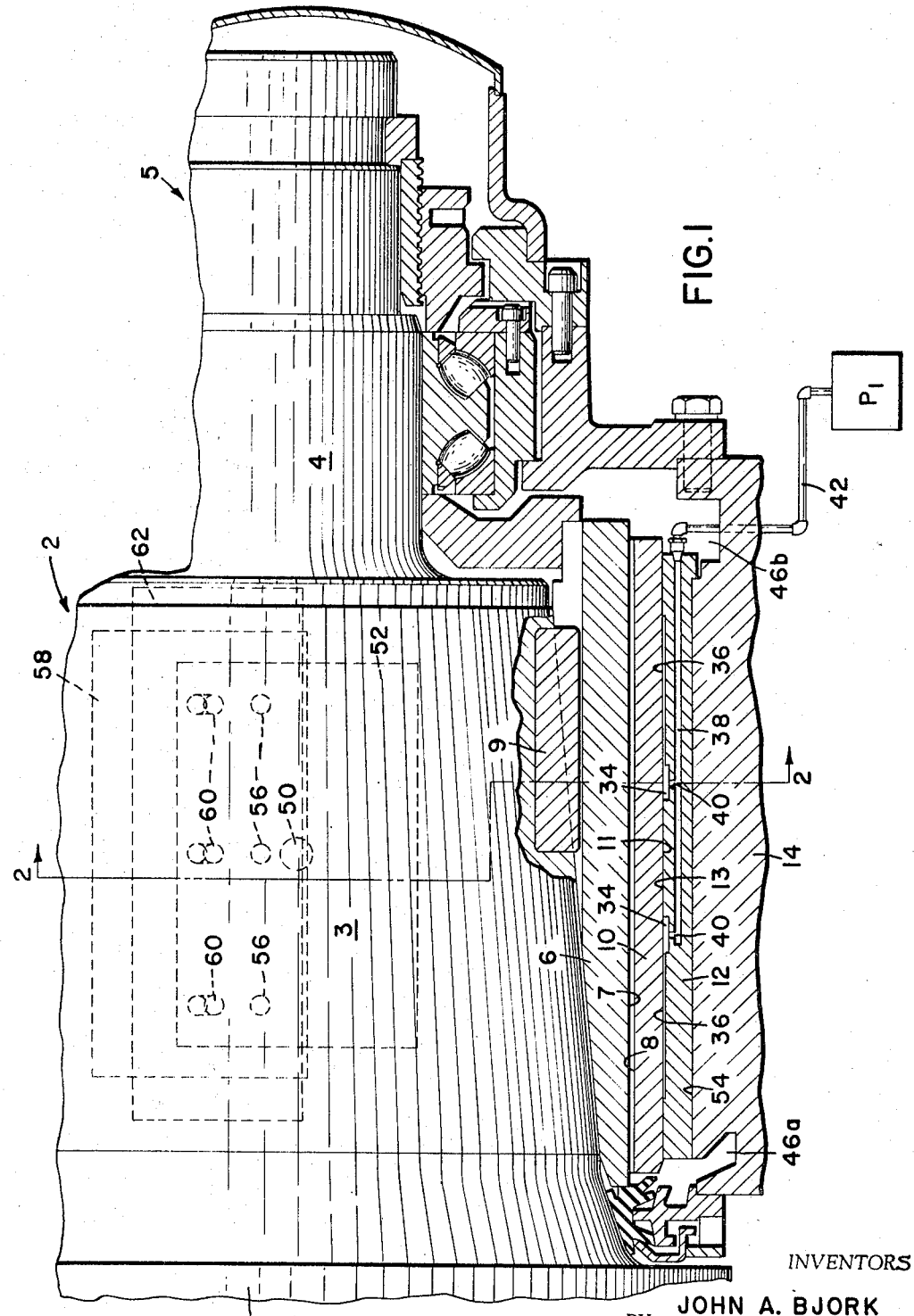
FIG. 1 is a partial sectional view of a rolling mill bearing assembly embodying the concepts of the present invention with a portion of the system for delivering high pressure lubricant to the bearing assembly indicated schematically.
Figure 2:
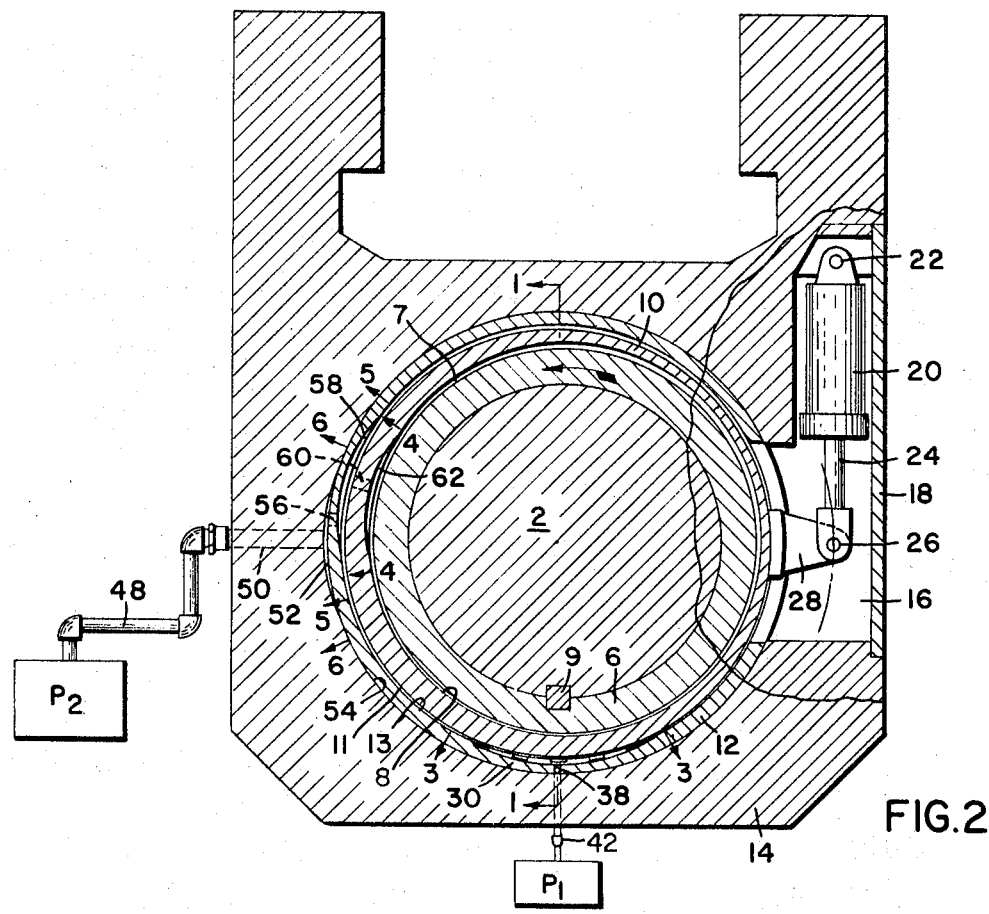
FIG. 2 is a sectional view on a reduced scale taken along line 2—2 of FIG. 1.
Figure 4:
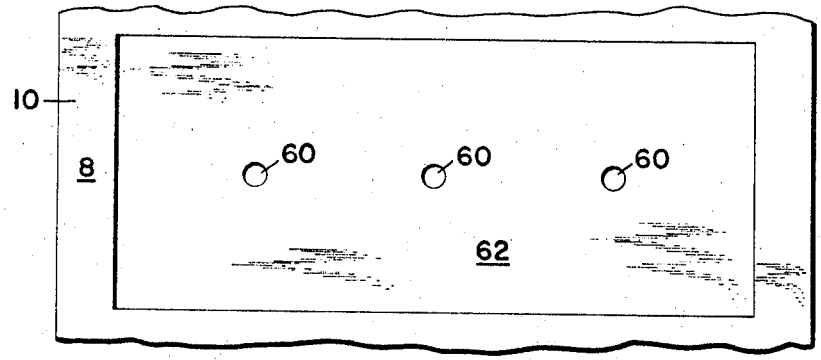
Figure 5:
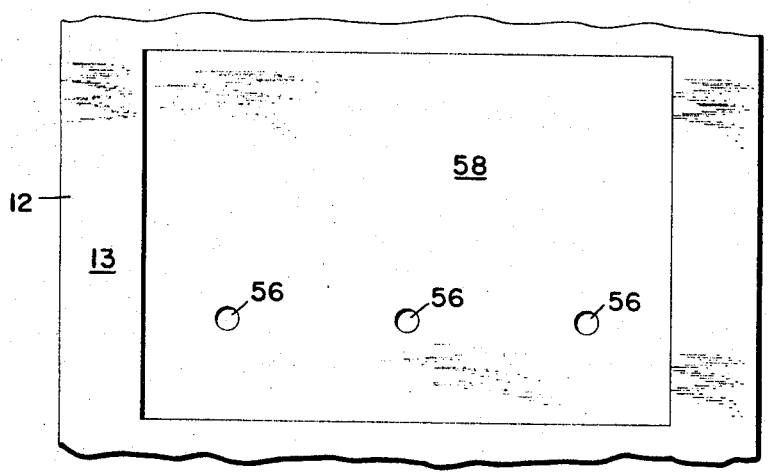
Figure 6:
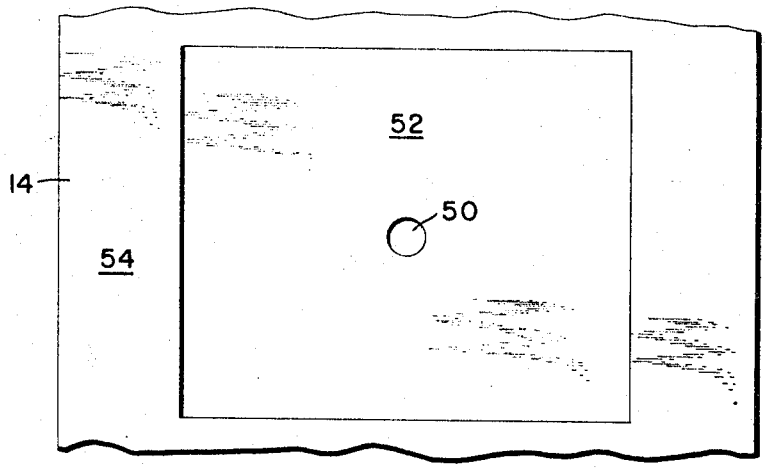

Referring initially to FIGS. 1 and 2, there is shown a portion of a conventional backup roll 2 for a rolling mill. Roll 2 has a tapered roll neck 3 with an extension 4 of lesser diameter terminating in a roll end generally indicated at 5. The roll neck 3 is journalled for rotation within a bearing assembly which includes a sleeve or journal 6 tapered on its interior to fit and rotate with the roll neck 3 and cylindrical on its exterior surface 7 to provide a journal surface which cooperates with the interior cylindrical surface 8 of an eccentric control sleeve 10. The journal 6 is keyed for rotation with shaft 2 by means of a key 9. Control sleeve 10 is in turn journalled for adjustable rotation within a fixed bushing 12 which is mounted in non-rotatable engagement within the stationary bearing housing or "chock" 14. Bushing 12 is not a strict requisite and can if desired be done away with, thus resulting in the eccentric control sleeve 10 being rotatably journalled within a cylindrical passageway of the chock itself.

As can best be seen by further reference to FIGS. 2 and 7, one side of chock 14 is cut-away to provide a chamber 16 enclosed during normal operation by a removable cover plate 18. Any conventional operating mechanism such as for example a double acting hydraulic cylinder 20 may be pivotally mounted within the chamber 16 by means of a transverse pin 22. The extensible piston rod 24 of cylinder 20 is in turn pivotally connected as at 26 to a bifurcated laterally extending arm 28 on control sleeve 10. By operating cylinder 20 to extend or retract piston rod 24, eccentric control sleeve 10 is caused to rotate relative to the surrounding chock 14. Rotation of sleeve 10 in turn results in the rotational axis of shaft 2 being displaced laterally, in this case in a substantially vertical direction. The sides 28a and 28b of arm 28 alternately bear against the walls 17 of chamber 16, thus providing a means of maintaining the control sleeve 10 centered within the bearing assembly.

To the extent thus described, the present apparatus is in many respects similar to the previously discussed prior art devices of the eccentric sleeve type. Attention will now be focused on the improvement herein claimed as being invention, namely, the lubricaton system employed to maintain lubricant films at the bearing load zone between the eccentric control sleeve 10, the outer cylindrical surface 7 of sleeve 6 and the inner cylindrical surface 13 of bushing 12. In this connection, it is to be understood that the term "bearing load zone" relates to the cylindrical bearing surface areas being forced together by the reactive force on roll 2 of the stock being rolled. Thus, in a bearing for a lower roll, (as shown in the drawings) the bearing load zone will be located in the lowermost half of the bearing assembly.

In the principal embodiment of the invention shown in FIGS. 1–7, two different and separate lubricating systems are employed. More particularly, a film of lubricant is maintained at the bearing load zone between bearing surface 13 of fixed bushing 12 and the outer cylindrical surface 11 of eccentric control sleeve 10 by means of a hydrostatic lubricating system which preferably includes at least two identical hydrostatic pads 30 in surface 13. As is best shown in FIG. 3, the pads 30 are symmetrically arranged on either side of the bearing center. Each pad includes a transversely extending groove 34 having fingerlike grooved extensions 36 of varying lengths running laterally therefrom towards each end of the bearing. Each groove 34 is connected to a common passageway 38 by means of relatively short reduced diameter intermediate passageways 40, the latter serving as flow restrictors. Passageway 38 is in turn connected to a constant volume high pressure lubricant pump $P_1$ by means of intermediate piping 42.

It is to be understood that the precise arrangement and configuration of hydrostatic pads 30 herein employed is illustrative only and is not of itself to be considered as a limitation upon the scope of the claims appended hereto. With this arrangement, high pressure lubricant is pumped by pump $P_1$ through piping 42, passageway 38 and thence up through intermediate passageways 40 at which point the lubricant undergoes a pressure drop prior to arriving in grooves 34. From here, the lubricant progresses outwardly through grooved extensions 36 towards the opposite ends of the bearing, thus creating a thin film which prevents metal-to-metal contact at the bearing load zone between the opposed bearing surfaces 11 and 13 of eccentric control sleeve 10 and bushing 12. The lubricant escaping from between sleeve 10 and bushing 12 is caught by appropriately positioned annular channels 46a and 46b and returned to a sump (not shown) from whence the lubricant is filtered by conventional means and again recirculated by pump $P_1$. In addition to "floating" the eeccentric sleeve 10 on a thin film of lubricant, this dual hydrostatic pad arrangement, when interconnected and fed from a single source, offers the added advantage of self-correction for angular shaft misalignment, as is more fully described and claimed in U.S. patent application Ser. No. 595,093, a co-opending application of one of the present inventors, and now abandoned.

The pressure profile produced by the above-described hydrostatic lubricating system is illustrated schematically by line 44 in FIG. 8 in relation to the bearing load zone. By maintaining a film of lubricant between the opposed bearing surfaces 11 and 13 of these two components, metal-to-metal contact is avoided, and frictional resistance becomes due to fluid shear only. Since velocity-induced flow of lubricant is small, fluid shear is small and total resistance to motion is virtually zero.

A second film of lubricant is maintained at the bearing load zone between the outer cylindrical surface 7 of sleeve 6 and the inner cylindrical surface 8 of eccentric control sleeve 10 by means of a separate hydrodynamic lubricating system. This second system includes lubricant pump $P_2$ connected via intermediate piping 48 to one end of a laterally extending passageway 50 in chock 14. The opposite end of passageway 50 is in communication with a fluid receiving pocket 52 (see FIG. 6) which is machined into the inner cylindrical surface 54 of chock 14. From pocket 52, the lubricant is carried by means of a plurality of intermediate passageways 56 (see FIG. 5) to a second fluid receiving pocket 58 machined into the inner cylindrical surface 13 of stationary bushing 12. Finally, the lubricant flows from pocket 58 through a second set of intermediate passageways 60 (see FIG. 4) in eccentric control sleeve 10 to a fluid receiving pocket 62 machined in the inner cylindrical surface 8 of sleeve 10.

As the lubricant arrives in pocket 62, it is picked up by the outer cylindrical surface 7 of rotating sleeve 6 and forced downwardly into the converging annular space between the opposed bearing surfaces of sleeve 6 and control sleeve 10 at the bearing load zone. The high pressure hydrodynamic wedge thus produced is partially the result of the viscosity and density of the fluid whereby the fluid resists changes in shape, and also the result of the rotational speed of the shaft. The magnitude and distribution of the hydrodynamic pressures thus produced is illustrated schematically in FIG. 9 by line 64 in relation to the bearing load zone. By hydrodynamically maintaining a thin lubricant film between sleeves 6 and 10 at the bearing load zone, the coefficient of friction is kept within a range as low as 0.0015 to 0.002.

With the arrangement as herein illustrated, it is contemplated that any required adjustment of the rotational axis of shaft 2 will be accomplished by rotating eccentric control sleeve 10±15°. Thus, the staggered arrangement of interconnected fluid receiving pockets 52, 58 and 60 will assure an uninterrupted supply of hydrodynamic lubricating fluid to the space between bearing surfaces 7 and 8.

By comparing FIGS. 8 and 9, it therefore can be seen that the combination of hydrostatic and hydrodynamic lubricating systems described above avoids metal-to-metal contact at the bearing load zone. The resulting reduction in coefficients of friction between bearing surfaces enables the eccentric sleeve 10 to be rotatably adjusted quickly and with relatively little effort. These two factors in turn contribute significantly to the system's ability to react quickly, thus making this type of arrangement ideally suited for automatic control of high speed rolling operations.

Figure 10:
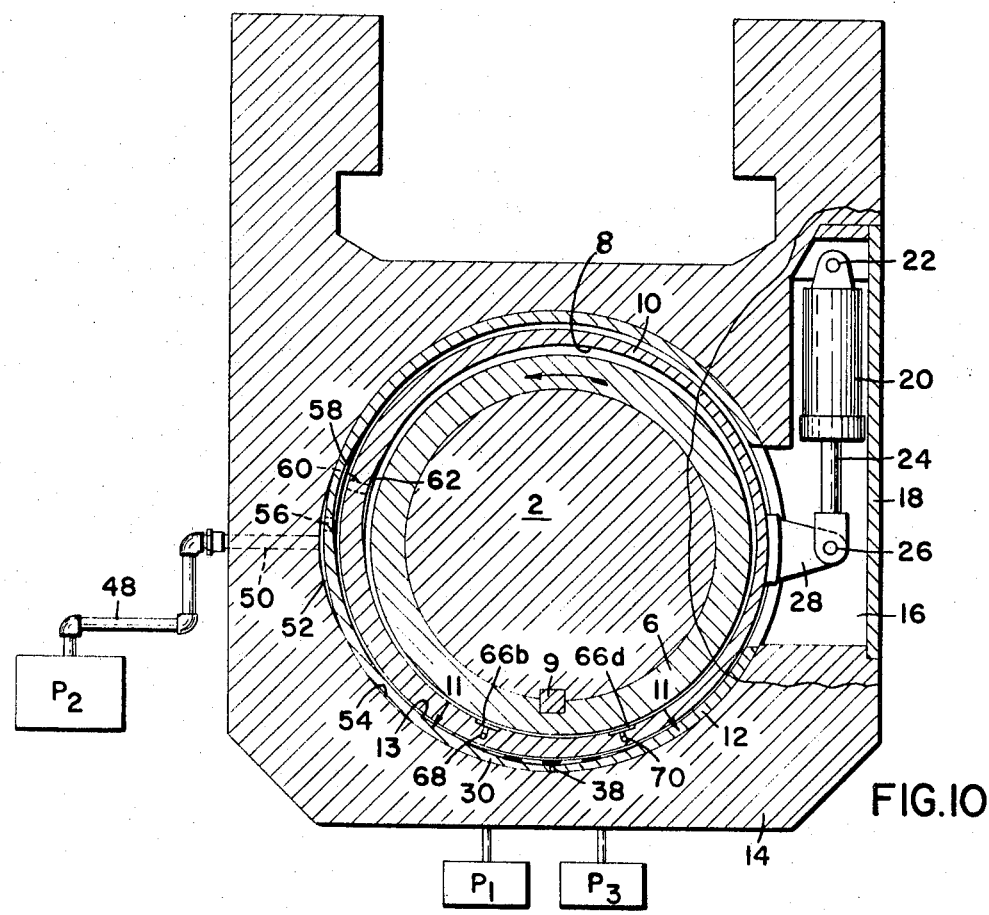
FIG. 10 is a sectional view similar to FIG. 2 showing an alternate embodiment of the invention; and, FIG. 11 is a sectional view taken along line 11—11 of FIG. 10.

An alternate embodiment of the invention is shown in FIGS. 10 and 11 wherein additional hydrostatic pads 66a, 66b, 66c and 66d have been machined into the inner bearing surface 8 of control sleeve 10 at the bearing load zone. Pads 66a and 66b are interconnected via short reduced diameter passageways 67 to a common passageway 68 drilled through sleeve 10. Pads 66c and 66d are similarly connected again by reduced diameter passageways 67 to a second passageway 70. The reduced diameter passageways 67 serve as flow restrictors which impart a self-correcting feature for angular misalignment similar to that mentioned above in connection with the co-pending application Ser. No. 595,093 of one of the present inventors. Both passageways 68 and 70, which include additional flow restrictors 69, are in turn interconnected at their outboard ends by means of flexible tubing 72 and piping 74 to a high pressure constant volume pump P₃. This alternate arrangement is especially suited for situations requiring rotative adjustment of eccentric control sleeve 10 at times when a hydrodynamic oil film is not being maintained at the bearing load zone between sleeves 6 and 10, i.e., when shaft 2 is either stopped or rotating at relatively slow speeds. Should the rotational axis of shaft 2 be offset relative to control sleeve 10, causing sleeve 6 to bear against one set of pads, for example pads 66a and 66b, the flow restrictor 69 will operate to impede lubricant flow through passageway 70 to the other set of pads 66c and 66d, thus insuring adequate flow to the pads 66a and 66b in the area where metal-to-metal contact is threatened. The opposite result would of course be obtained if metal-to-metal contact were threatened in the area served by pads 66c and 66d. When the speed of the shaft 2 is increased to a point where the oil film between sleeves 6 and 10 is again hydrodynamically maintained, pump P₃ may be shut off.

It is our intention to cover all changes and modifications of the embodiments chosen for purposes of disclosure which do not depart from the spirit and scope of the invention.

We claim:

1. A bearing for a rotatable element comprising: a housing assembly; an eccentric control sleeve journalled for rotation within said housing assembly, said element in turn being journalled for rotation within said control sleeve; lubricating means for maintaining lubricant films under pressure between said control sleeve and said housing assembly and between said sleeve and said element at the bearing load zone; and, means for rotatably adjusting said control sleeve, thus causing the rotational axis of said shaft to be shifted laterally relative to said housing assembly.

2. The apparatus as set forth in claim 1 wherein said lubricating means is comprised in part of a first hydrostatic means for maintaining a lubricant film between said control sleeve and said housing assembly, said first hydrostatic means including at least one lubricant receiving cavity defined by the opposed bearing surfaces of said control sleeve and housing assembly at the bearing load zone, and means for pumping lubricant under pressure into said cavity.

3. The apparatus as set forth in claim 2 wherein said first hydrostatic means includes a plurality of fluid receiving cavities defined by the opposed bearing surfaces of said control sleeve and housing assembly, and conduit means interconnecting each said cavities, the said conduit means in turn being connected to said means for pumping lubricant.

4. The apparatus as set forth in claim 1 wherein said lubricating means is comprised in part of hydrodynamic means for maintaining a film of lubricant between said control sleeve and said rotatable element.

5. The apparatus as set forth in claim 4 further characterized by said lubricating means including hydrostatic means for supplementing said hydrodynamic means by maintaining a lubricant film between said control sleeve and rotatable element during relatively low speed rotation of said element.

6. A bearing assembly for a rotating element comprising: a housing assembly; an eccentric control sleeve journalled for rotation within said housing assembly, the said element in turn being journalled for rotation within said control sleeve; hydrostatic lubricating means for maintaining a film of pressurized lubricant between said control sleeve and said housing assembly at the bearing load zone, said means including a plurality of fluid receiving cavities in the inside bearing surface of said housing assembly, each said cavities being connected by means of intermediate conduits to a common source of constant volume high pressure lubricant; hydrodynamic lubricating means for maintaining a film of pressurized lubricant between said control sleeve and said rotatable element at the bearing load zone, said hydrodynamic means being operative regardless of the permissible rotative adjustment of said control sleeve relative to said housing assembly; and, operating means for rotating said control sleeve in order to laterally adjust the rotational axis of said element.

References Cited
UNITED STATES PATENTS

| | | | |
|---|---|---|---|
| 789,917 | 5/1905 | Jordan | 51—244 |
| 1,278,800 | 9/1918 | Farnum | 308—62 |
| 2,216,926 | 10/1940 | Symons et al. | 308—9 X |
| 2,955,002 | 10/1960 | Rich | 308—36.2 |
| 3,005,666 | 10/1961 | Morser et al. | 308—122 |

CARROLL B. DORITY, Jr., *Primary Examiner.*

U.S. Cl. X.R.

308—62, 122